Figure 1:
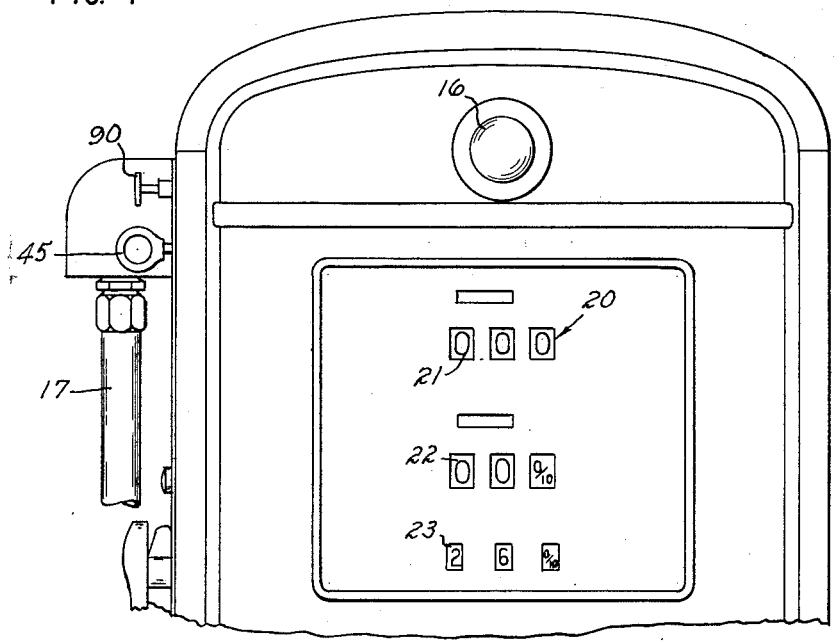

April 30, 1963 H. N. BLISS ETAL 3,087,651
PRESELECTOR MECHANISM FOR LIQUID DISPENSING APPARATUS
Filed March 17, 1959 5 Sheets-Sheet 1

INVENTORS
HARVEY N. BLISS
GEORGE W. WHITE

BY *Lindsey and Prutzman*
ATTORNEYS

April 30, 1963    H. N. BLISS ETAL    3,087,651
PRESELECTOR MECHANISM FOR LIQUID DISPENSING APPARATUS
Filed March 17, 1959    5 Sheets-Sheet 2

INVENTORS
HARVEY N. BLISS
GEORGE W. WHITE

BY Lindsey and Prutzman
ATTORNEYS

April 30, 1963  H. N. BLISS ETAL  3,087,651
PRESELECTOR MECHANISM FOR LIQUID DISPENSING APPARATUS
Filed March 17, 1959  5 Sheets-Sheet 3

INVENTORS
HARVEY N. BLISS
GEORGE W. WHITE

BY *Lindsey and Prutzman*
ATTORNEYS

INVENTORS
HARVEY N. BLISS
GEORGE W. WHITE

BY *Lindsey and Prutzman*
ATTORNEYS

April 30, 1963  H. N. BLISS ETAL  3,087,651
PRESELECTOR MECHANISM FOR LIQUID DISPENSING APPARATUS
Filed March 17, 1959  5 Sheets-Sheet 5
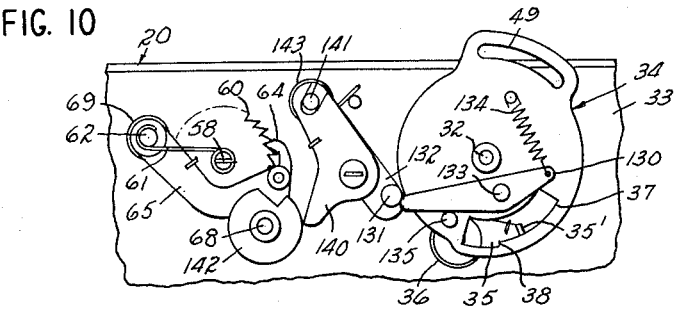
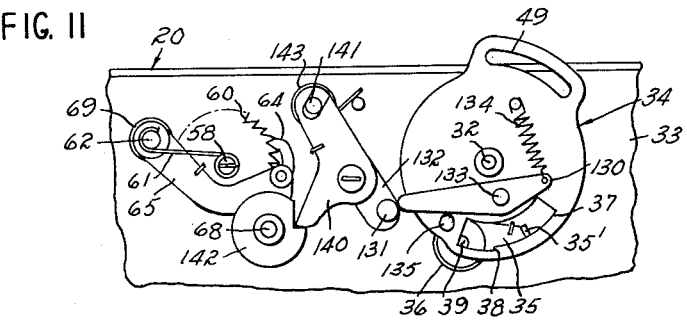
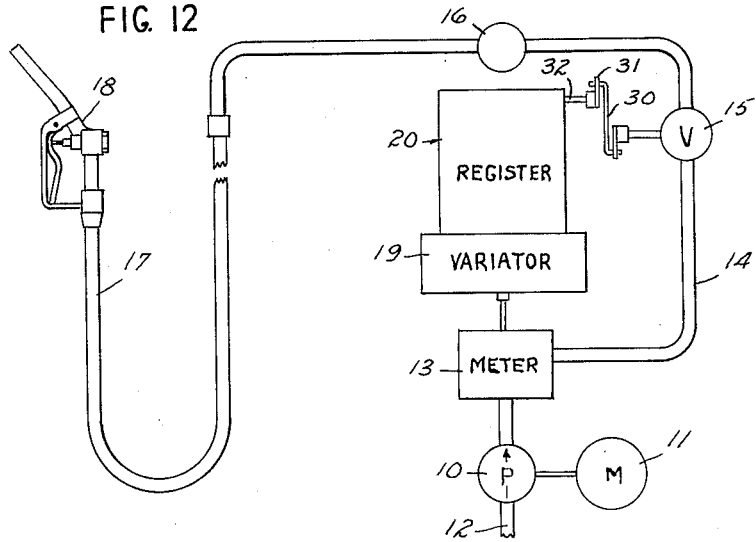
INVENTORS
HARVEY N. BLISS
GEORGE W. WHITE
BY *Lindsey and Prutzman*
ATTORNEYS United States Patent Office
3,087,651
Patented Apr. 30, 1963

3,087,651
PRESELECTOR MECHANISM FOR LIQUID
DISPENSING APPARATUS
Harvey N. Bliss, Windsor, and George W. White, West Hartford, Conn., assignors to Veeder-Root, Incorporated, Hartford, Conn., a corporation of Connecticut
Filed Mar. 17, 1959, Ser. No. 800,008
15 Claims. (Cl. 222—16)

The present invention relates to liquid dispensing apparatus and is concerned more particularly with an improved preselector mechanism whereby the apparatus may be conveniently and accurately set for use in a dispensing operation to dispense a preselected amount of liquid and to automatically terminate the delivery of liquid when the preselected amount has been dispensed.

The mechanism of the present invention is an improvement in the preselector mechanism disclosed and claimed in the copending application of the present applicants, Serial No. 710,306 filed January 21, 1958, now U.S. Patent No. 3,037,666, and the present application is a continuation-in-part of said application.

As set forth in said copending application Serial No. 710,306 now U.S. Patent No. 3,037,666, it frequently is desirable in connection with liquid dispensing apparatus and particularly in the field of gasoline service stations, which is a principal market for apparatus of this type, for the operator to be relieved of the responsibility of watching the counter which registers the amount of liquid as it is being dispensed and of terminating the dispensing operation when the customer's order has been filled. The present invention is concerned with a preselector mechanism of maximum convenience for automatically terminating a dispensing operation upon completion of thet dispensing of a preselected amount of liquid and which may be set within reasonable limits by a simple push button operation.

The apparatus of the present invention is constructed and arranged for use with dispensing apparatus having flow control means, a meter for measuring the quantity of liquid dispensed, and a register connected to the meter for counting or registering the rotation of the meter. An aim of the present invention is to provide a preselector mechanism of simplified structure and compact size so that it may be installed as a part of the register mechanism in a unitary structure and with resultant lesser space requirements in the dispensing apparatus. Included in this aim is the provision of such a preselector mechanism which despite its reduced size and number of parts will be accurate and foolproof in operation and which will possess the desired advantages of convenience in use and including non-interference with the conventional operation of the dispensing apparatus when it is desired to dispense liquid without making use of the preselector mechanism.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 2:
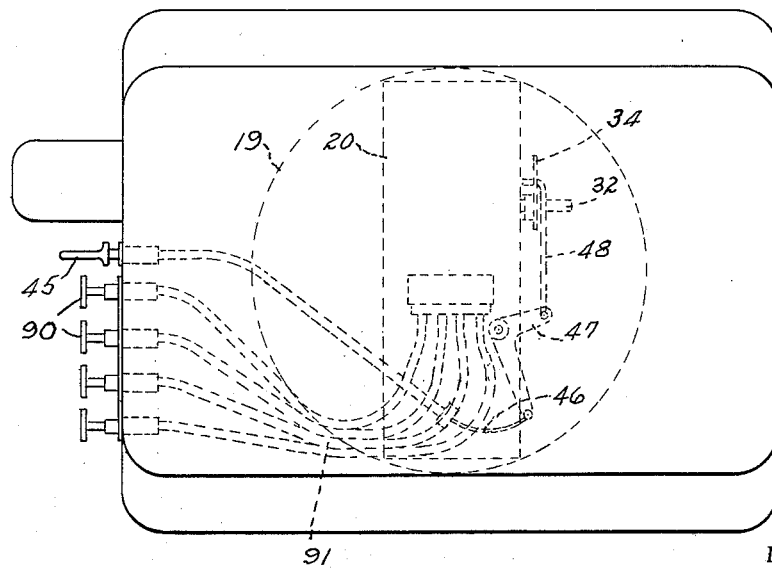
Figure 3:
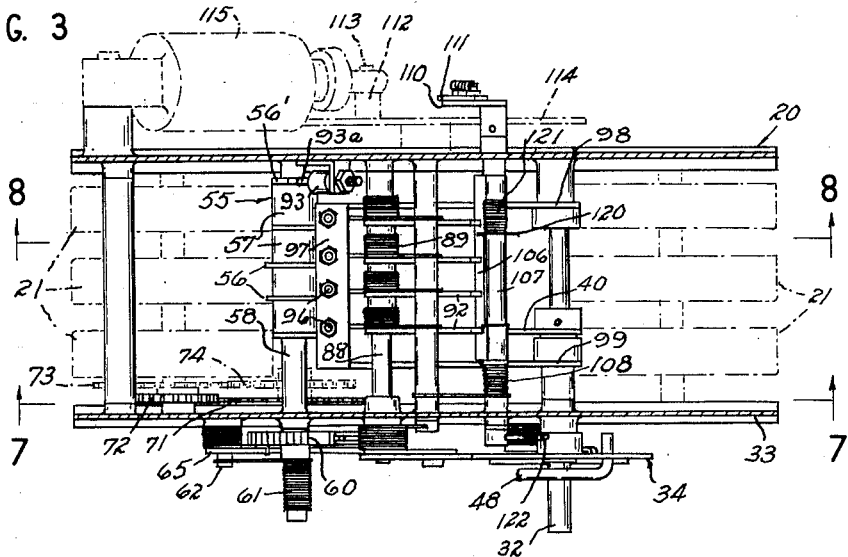
Figure 4:
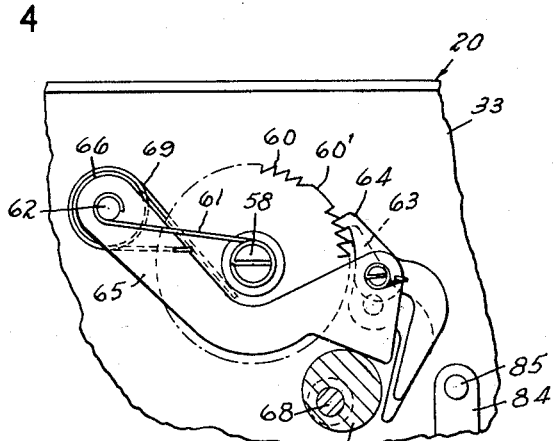
Figure 5:
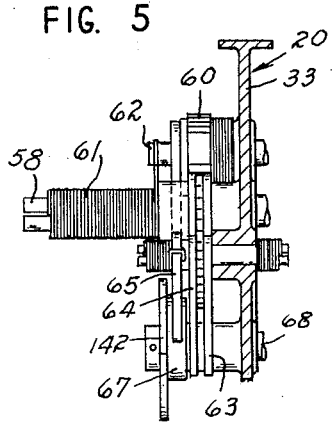
Figure 6:
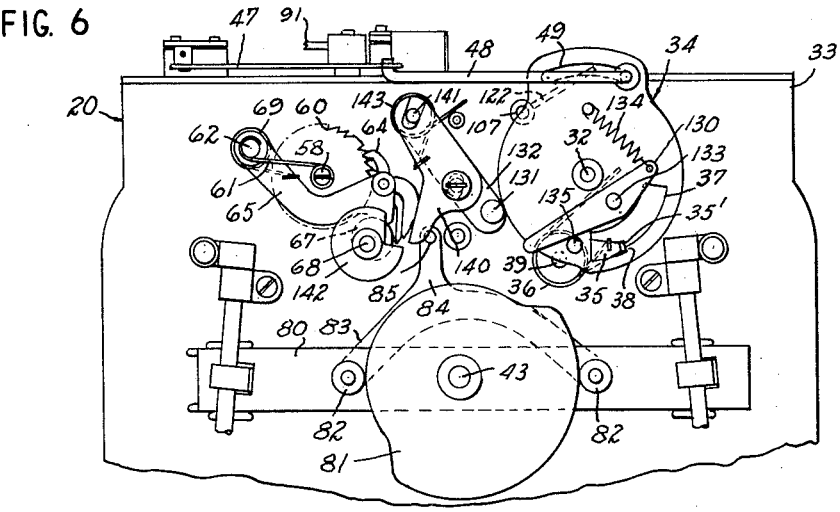
Figure 7:
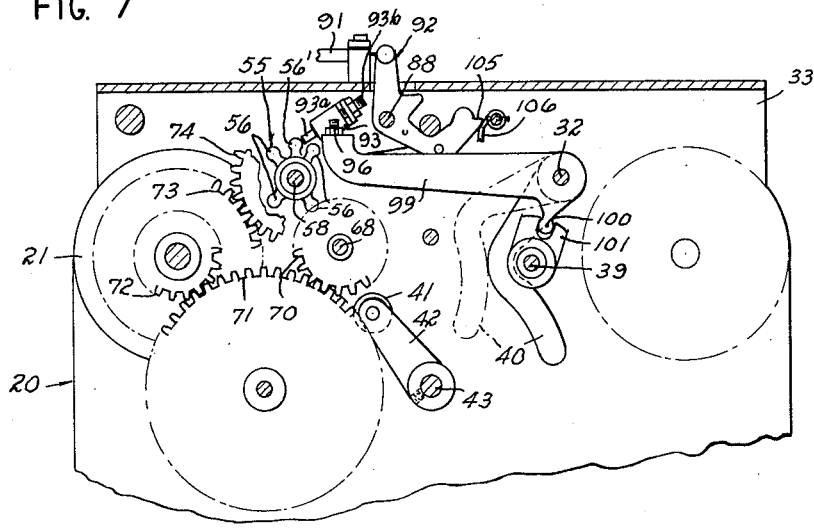
Figure 8:
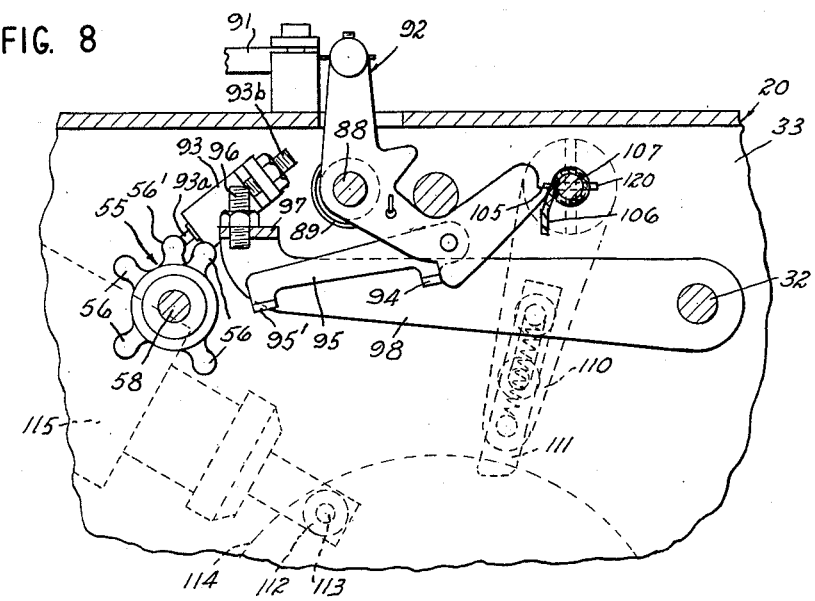
Figure 9:
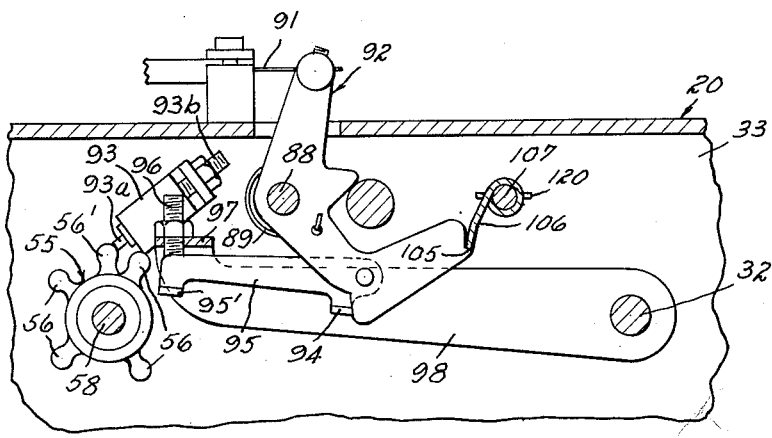

In the drawings:
FIG. 1 is a fragmentary front view of a gasoline dispensing apparatus with the mechanism of the present invention installed therein;
FIG. 2 is a top view of the apparatus shown in FIG. 1;
FIG. 3 is a top view of the register with the preselector mechanism incorporated therein, the top plate being removed and certain portions of the register being shown in dotted lines;
FIG. 4 is a fragmentary enlarged side view of the register showing a portion of the driving mechanism for the preselector and with the final knock-off cam removed;
FIG. 5 is an end view of the mechanism shown in FIG. 4 with the frame in cross section;
FIG. 6 is a fragmentary side view of the register and portions of the preselector mechanism in position at the beginning of a dispensing operation;
FIG. 7 is a cross sectional view taken along the line 7—7 of FIG. 3;
FIG. 8 is a fragmentary cross sectional view taken along the line 8—8 of FIG. 3;
FIG. 9 is a view similar to FIG. 8 with parts in position when the associated pushbutton has ben actuated;
FIG. 10 is a fragmentary side view similar to FIG. 6 and showing the valve control elements in position wherein the valve is partially closed;
FIG. 11 is a view similar to FIG. 10 showing the parts in position wherein the valve is released for final closing movement; and
FIG. 12 is a diagrammatic view of the major components of the liquid dispensing apparatus.

Referring to the drawings, the invention has been illustrated in connection with gasoline dispensing apparatus which except for the portions added in accordance with the present invention is of known commercial design and construction. To assist in the understanding of the invention, the principal components of the dispensing apparatus have been shown diagrammatically in FIG. 12 of the drawings. Referring to FIG. 12, there is shown a pump 10 driven by electric motor 11 which pumps the gasoline to a meter 13 from an inlet pipe 12 connected to a resrvoir (not shown). After passing through the meter 13 the gasoline is conducted by conduit 14 through the auxiliary valve 15 and thence through the visi-gauge 16 to the dispensing hose 17 provided at its outer end with a conventional automatic nozzle 18 of the type which can be latched in open position. The driven shaft of the meter which rotates in proportion to the amount of gasoline passing through the meter is connected to a variator or speed change mechanism 19 which in turn is connected to the register 20.

The register 20 is of the type shown in the Bliss Patent No. 2,814,444 issued November 26, 1957. As best shown in FIGS. 1 and 3 of the drawings, the register 20 has at each end thereof a first set of number wheels 21 for the purpose of indicating the cost of the liquid dispensed and a second set of number wheels referred to as the quantity number wheels 22, which register the quantity of the gasoline dispensed. The smaller number wheels 23 do not rotate during a dispensing operation and are used merely to indicate the price setting of the variator or speed change mechanism 19. The details of the register 20 have been omitted for the most part and only those portions have been included in the drawings which are essential to an understanding of the present invention. Reference may be had to said Bliss Patent No. 2,814,444 for further details of the structure if desired. The register 20 is of the type wherein the cost number wheels 21 and quantity number wheels 22 rotate from zero in an adding direction in response to rotation of the meter during a dispensing operation to register the cost and quantity of the gasoline dispensed and at the end of a dispensing operation, the register is reset to zero.

The preselector mechanism of the present invention automatically terminates the dispensing operation by control of the auxiliary valve 15, previously described. The auxiliary valve 15 is of the self-closing type by which is meant that it is biased to a closed position. As indicated in FIG. 12 of the drawings the auxiliary valve 15 is connected by means of a connecting rod 30 to a valve control arm 31 which is fixed to the outer end of a valve control shaft 32. The control shaft 32 extends transversely across the register near the top thereof and is journalled in the register frame 33. The rotated position of shaft 32 is controlled by a control plate 34 which is fixed to the valve control shaft 32 adjacent its outer end as best shown in FIG. 6 of the drawings. When the valve 15 is in fully opened position, the control plate 34 is in the rotated position shown in FIG. 6 of the drawings and the mechanism is held in this valve-open position by a pawl 35 which is biased in a clockwise direction by the spring 36 and which has an inturned nose portion 35' received in the arcuate slot 37 for engagement with the shoulder 38 as shown in FIG. 6.

The mechanism can be turned to and cocked in the holding position shown in FIG. 6 with the valve 15 fully opened in either of two ways. The usual cocking mechanism utilizes a lever 40 fixed to and extending radially from the control shaft 32 so that it will rotate with the control shaft 32. The position shown in solid lines in FIG. 7 of the drawings is the position when the valve is fully open and the dotted line position is when the valve is closed. In the dotted line position the lower or free end of the lever 40 is in the path of a roller 41 attached to the outer end of an arm 42 which in turn is fixed to the main reset shaft 43 of the register. Consequently, when the main reset shaft 43 of the register is turned by the operator to turn off the pump motor and load the main reset spring (not shown) of the register, which normally takes place at the end of a dispensing operation, the arm 42 connected thereto will engage and cam the lever 40 to the solid line position, thus rotating the control shaft 32 to open the auxiliary valve 15. Once the auxiliary valve 15 is opened it is latched in open position by the holding pawl 35 as previously described. A second cocking mechanism for opening the auxiliary valve 15 which is independent of the register, includes a pull-handle 45, best shown in FIGS. 1 and 2 of the drawings, which is connected by a wire 46 to one end of a bell crank lever 47 pivotally mounted on the top of the register frame and which has its other end connected to a rod 48 having an in-turned outer end engaged in the arcuate slot 49 provided in the control plate 34. By pulling on the pull-handle 45 at any time, the operator can rotate the control plate 34 to its cocked position thus fully opening the auxiliary valve 15. The arcuate slot 49 provides a lost motion connection so that after actuation, the handle 45 may be released and returned to original position with the end of the rod 48 merely moving to the far end of the slot 49 as shown in FIG. 6. The lost motion connection provided by slot 49 also assures that the rod 48 will not interfere with the automatic release of the control plate 34 to be described hereinafter.

The knock-off or releasing mechanism for releasing the control plate 34 automatically upon the dispensing of a preselected amount of liquid comprises a cam assembly 55 formed of a plurality of angularly related cams or cam promontories 56 and spacers 57, the cam assembly 55 being secured to a drive shaft 58 extending transversely of the register adjacent the top thereof and journalled in the register frame 33. The outer end of the shaft 58 is provided with a ratchet wheel 60 and a reset spring 61, the reset spring 61 being a coil spring on the shaft having one end disposed in a slot in the shaft and having its other end connected to the pin 62 on the side of the register frame 33.

The ratchet wheel 60 is driven and controlled by a pair of pawls 63 and 64. The pawl 63 is a holding pawl pivotally mounted on the side of the register frame 33 and is spring biased into engagement with the ratchet 60 so that it normally prevents rotation of the ratchet wheel 60 in a clockwise direction, but does not interfere with rotation of the ratchet 60 in a counterclockwise direction. The pawl 64 is a driving pawl which is pivotally mounted on the end of a drive arm 65 having a hub 66 pivotally mounted on the pin 62, previously referred to, and having its outer end in engagement with the periphery of an eccentric 67. The eccentric 67 is mounted on and driven by a stub shaft 68 journalled in the side wall of the register frame. The drive arm 65 is biased into engagement with the eccentric 67 by a coil spring 69. As will be apparent, during rotation of the eccentric 67, the outer end of the drive arm 65 will follow the periphery of the eccentric 67, and thus will be oscillated up and down causing the drive pawl 64 to oscillate and turn the ratchet wheel 60 in a counterclockwise direction.

The eccentric 67 is secured to the shaft 68, as previously mentioned, and the inner end of shaft 68 which is inside the register frame 33 has fixed thereto a driving gear 70. The driving gear 70, as best shown in FIG. 7 of the drawings, is driven through idler gear 71 by a take-off gear 72 secured to the hub of the lowest order number wheel of the set of number wheels 21. In the embodiment shown in the drawings, the preselector mechanism is arranged to operate in terms of the cost or money value of the liquid dispensed and thus the drive for the eccentric 67 is connected to the hub of the lowest order number wheel of the cost number wheels 21 so as to rotate therewith both in a counting and in a resetting direction. As will be apparent, if the preselector were to be arranged for operation in terms of the quantity or gallonage of the liquid dispensed, then the drive would be connected to the hub of the lowest order number wheel of the quantity number wheels 22. The gears 73 and 74 are added for completeness to show a portion of the driving mechanism of the register by means of which the lowest number wheel is rotated during a counting or dispensing operation.

While the eccentric 67 turns with the number wheel and is reset simultaneously therewith, the resetting of the ratchet wheel 60 and cam assembly 55 secured thereto is performed independently by releasing the pawls 63 and 64. This is accomplished in the present embodiment by utilizing the movement of the slide 80 which is mounted for longitudinal sliding movement on the side of the register and which is moved to the left, as viewed in FIG. 6 of the drawing, when the main reset shaft 43 is actuated by the operator. As previously explained, the shaft 43 is turned in a clockwise direction when the operator turns off the pump motor at the completion of a dispensing operation. The cam 81 which is fixed to the main reset shaft 43 for rotation therewith, cooperates with the rollers 82 of the slide 80 to shift the slide 80 when the shaft 43 is turned. The pins on which the rollers 82 are mounted are utilized to mount the yoke 83 having a finger 84 at its upper end provided with a roller 85 for engagement with the tails of the two pawls 63 and 64. Accordingly, when the main reset shaft 43 is turned at the end of a dispensing operation the slide 80 is moved to the left as viewed in FIG. 6 of the drawings, carrying with it the yoke 83 which in turn engages the roller 85 with the pawls 63, 64, thus releasing the ratchet 60 and permitting it together with the cam assembly 55 to return to the original position under the influence of the reset spring 61. At this point, it may be noted that the ratchet wheel 60 has its teeth interrupted at 60' so that the ratchet wheel 60 cannot be turned more than one revolution during a dispensing operation. Only one revolution of the ratchet wheel 60 is required to provide a desired range of the preselector mechanism and by limiting the rotation to one revolution, excess winding of the reset spring 61 is avoided in the event that the dispensing apparatus is utilized to dispense a very large quantity of liquid in a single dispensing operation.

As previously noted, the cams 56 are spaced longitudinally of the shaft 58 and the promontories of these cams are angularly related. The cams 56 are used selectively to initiate release of the control shaft 32 connected to the auxiliary valve 15. The selection of the particular cam 56 which is to initiate release of the shut-off mechanism, is accomplished by the operator by use of the push buttons 90 which, for convenience and easy accessability, may be mounted at the control side of the dispensing apparatus as shown in FIG. 1 of the drawings. Each push button 90 is connected by means of a wire 91 to one of the bell crank levers 92 rotatably mounted on a shaft 88 and each biased in a counter-clockwise direction by a spring 89. A separate bell crank 92 is provided for each one of the cams 56 with the exception of the end cam 56' which is not an operating cam but is utilized merely to abut against the stop 93 for accurate positioning of the cam assembly 55 in original starting position when the cam assembly is reset by release of the pawls 63, 64. The stop 93 is formed with a spring pressed plunger 93a which provides a shock-absorbing action when the same is engaged by cam 56' in a resetting operation. In addition, the position of the stop 93 can be adjusted by means of the screw 93b which provides a convenient factory adjustment for accurately setting the initial position of the cam assembly and ratchet wheel 60.

Each lever 92 has an arm 95 pivotally mounted thereon and which by reason of its weight is biased downwardly but is restricted in movement by the lug 94 thereon which engages the adjacent edge of lever 92. The outer end of the arm 95 has a bent-over end piece or flange 95' which normally is positioned outside the orbit of the promontory of the particular cam with which the arm 95 is associated. However, if any of the bell crank levers 92 are pivoted in a clockwise direction as viewed in FIG. 8 of the drawings, which is accomplished by pressing a selected push button 90, the flange 95' of the arm 95 mounted on the lever 92 will be moved into position where it will engage an adjusting screw 96 and will be in the orbit of the associated cam 56. This actuated position is shown in FIG. 9 of the drawings. The adjusting screws 96 are secured to a plate 97 supported on the arms 98 which in turn are pivotally mounted on the shaft 32. Thus when the mechanism is placed in the condition shown in FIG. 9, the rotation of the selected cam 56 will engage and pivot the arm 95 and thus raise the plate 97. Each cam 56 has its promontory located at an angular position such that it will be effective to raise the plate 97 just shortly before the selected value of liquid has been dispensed. In its specific embodiment shown in the drawing, their value is one, two, three and four dollars as indicated on the push buttons 90. The adjusting screws 96 provide a convenient factory adjustment feature whereby the operation of each individual cam promontory can be set precisely after adjustment of the stop 93.

The arm 99 connected to plate 97 is provided adjacent its pivot end with an ear 100 which is seated in a fork 101 which in turn is secured to the shaft 39 on which is mounted the holding pawl 35. As a result of this construction, pivoting movement of the frame consisting of the plate 97 and arms 98, 99 in a clockwise direction, as viewed in the drawings, will cause turning of the shaft 39 sufficient to release the pawl 35 from the shoulder 38 of the control plate 34. This in turn releases the auxiliary valve 15 for movement in a closing direction.

When any one of the bell crank levers 92 is pivoted by operation of a selected push button 90, the lever 92 is held in actuated position by engagement of its shoulder 105 beneath the edge of a pivoted holding plate 106 as shown in FIG. 9. The holding plate 106 is pivotally mounted on a shaft 107 and is biased to holding position by the coil spring 108. When the bell crank lever 92 is first moved to actuated position, it first cams the retaining plate 106 inwardly to permit the end of the lever arm 92 to pass by the plate 106 following which the plate snaps back under the influence of spring 121 to engage on the shoulder 105. This pivoting of the holding plate 106, whenever a lever 92 is actuated, also serves the purpose of disengaging any other lever 92 which might have been actuated previously inadvertently or otherwise. Thus it will be seen, that by operation of a selected push button 90, the operator can condition any one of the cams 56 for actuation of the plate 97 which in turn will cause release of the control plate 34 and thus initiate closing movement of the auxiliary valve 15. While in the specific embodiment, four push buttons and cams are arranged for operation at amounts of one, two, three and four dollars, it will be apparent that other settings could be employed and additional push buttons and cams could be provided if desired. Also as previously mentioned the predeterminer may be designed for operation in terms of quantity rather than in cost of the liquid dispensed.

In order to release any previously actuated levers 92 when the main reset shaft 43 of the register is rotated at the end of a dispensing operation as the pump motor is turned off, there is provided an arm 110 fixed to the shaft 107, having a spring mounted plunger 111 at its outer end. The end of the plunger 111 normally extends into the path of movement of a roller 112, mounted on a pin 113 on the disc 114 which is connected to the main reset shaft 43 for rotation therewith. In the specific embodiment, the pin 113 is the same pin which connects the disc 114 to the dashpot 115 shown in dotted lines. As will be apparent from a consideration of FIG. 8 of the drawings, when the disc 114 is turned in a clockwise direction, the roller 112 will engage the plunger 111 on the arm 110 and thus cause the arm 110 to pivot in a counter-clockwise direction, thus turning the shaft 107. The holding plate 106 is moved to releasing position by turning of shaft 107 by reason of the pin 120 which extends transversely through the shaft 107 for engagement with the plate 106. The shaft 107 is returned to its original position by the coil spring 121. A further means for pivoting the holding plate 106 to disengaging position, is a pin 122 fixed to the shaft 107, as best shown in FIG. 6 of the drawings, and extending into the path of movement of the turned-in end of the rod 48. Thus in the event that the pull handle 45 is actuated to open the auxiliary valve 15 there will be an automatic release of any of the levers 92 which may have been previously actuated to engaged position.

Coming now to the final shut-off mechanism, it will be recalled that when the holding pawl 35 is released from the shoulder 38, which occurs when the selected cam 56 has moved the plate 97 upwardly, the control plate 34 is free to rotate and this in turn permits rotation of the control shaft 32 and thus the auxiliary valve 15 which is biased to a closed position will move in a closing direction. Closing action of the auxiliary valve 15 is interrupted prior to complete closing of the valve, however, by engagement of the outer end of lever 130 with a pin 131 mounted on the outer end of stop arm 132. This partially closed position is shown in FIG. 10 of the drawings. The lever 130 is pivoted on the control plate 34 at 133 and is biased by spring 134 against the stop 135. The reason for this construction is that the lever 130 will be effective to stop rotation of the control plate 34 when it engages the stop arm 132 during clockwise rotation of the control plate 34, but when the control plate 34 is moved in the opposite direction, the lever 130 will merely pivot out of engagement with the stop arm 132 and thus will not interfere with resetting of the control plate 34. The stop arm 132 is connected to a cam follower 140 and both are pivoted on the frame at 141. The follower 140 cooperates with a notched disc or cam 142 which is formed integrally on the outer side of the eccentric 67. The cam 142 thus rotates in unison with the eccentric 67 and is similarly rotated by the number wheel of lowest order. The stop arm 132 and cam follower 140 are biased toward the control plate 34 by the spring 143 so that the pin 131 on the arm 132 will normally be in position to engage the end of lever 130 and thus halt rotation of the control plate 34 in position where the auxiliary valve 15 is only partially opened. The notch in disc 142 is located relative to the promontories of the cams 56 so that when any selected cam 56 actuates the plate 97 to release the holding pawl 35, the end of cam follower 140 will engage the periphery of cam 142 in advance of the notch therein. Thus when the control plate 34 has been released to permit closing movement of the auxiliary valve 15, the tail of lever 130 will engage the pin 131 of stop arm 132 which in turn will be prevented from moving out of stopping position by reason of the engagement of the cam follower 140 with the periphery of the notched disc or cam 142. This position as previously mentioned is best shown in FIG. 10 of the drawing.

The liquid dispensing operation will thus continue but at a greatly reduced rate until sufficient liquid has been dispensed to cause rotation of the notched disc 142 to the point where the notch registers with the end of the cam follower 140 thus permitting the stop arm 132 and cam follower 140 to be pivoted out of stopping position causing final release of the control plate 34 and thus final release and final closing movement of the auxiliary valve 15, thus ending the dispensing operation. This final releasing step is shown in FIG. 11 of the drawings. The cam follower 140 and stop arm 132 are made as separate pieces to permit adjustment of the follower relative to the cam 142. This may be a field adjustment after the mechanism has been installed in the dispensing apparatus to assure that the final closing of valve 15 will take place precisely at the preselected value of liquid dispensed.

The operation of the preselector mechanism of the present invention will be apparent from the foregoing description taken together with the following explanation. Assuming that the register has been reset and it is desired to commence a dispensing operation, the operator may conveniently set the mechanism for dispensing either one, two, three or four dollars worth of liquid, merely by pressing the proper push button 90. This can be done either before or after the pump motor is turned on and if the operator should inadvertently push the wrong button or should change his mind after pushing one of the buttons, he can merely change the setting by pressing a different selected button whereupon the first button will be released. At this stage, the auxiliary valve 15 is latched in the full open position and the control plate 34 in turn is held by the holding pawl 35 as shown in FIG. 6 of the drawings. The nozzle 18 will be placed by the operator in the filler pipe of the tank or other receptacle for the liquid to be dispensed and will be latched in open position. Dispensing will continue until the selected cam 56 engages the arm 95 of the control lever 92 which has been moved into operative position by operation of the selected push button and through the arm 95 will cause the plate 97 to be moved upwardly. Since the plate 97 is attached to the arms 98 and 99, the latter of which has an ear 100 seated in the U-shaped fork 101, the upward movement of plate 97 will cause the holding pawl 35 to be released from the shoulder 38. As soon as this occurs, control plate 34 is released to move to the position shown in FIG. 10 of the drawings wherein the auxiliary valve 15 is partially closed. Dispensing then continues at a greatly reduced rate until the cam follower 140 is received by the notch in the disc 142 as shown in FIG. 11, whereupon the control plate 34 is again released to permit final closing of the auxiliary valve 15. The closing of auxiliary valve 15 in stages as just described permits the mechanism to be precisely adjusted so that the final shut-off will occur exactly when the desired quantity of liquid has been dispensed. If for any reason the operator desires to continue dispensing liquid after the mechanism has automatically closed the auxiliary valve 15, he is permitted to do so merely by pulling the pull handle 45 which as previously described will reset the mechanism to original position. Also it will be noted that while the dispensing operation is continuing the operator may change the setting by pressing a different push button 90, the only limitation being that the amount set must be higher by approximately 50 cents than the amount already dispensed in order to effect an automatic termination of the dispensing operation.

At the end of a dispensing operation, the operator will turn off the pump motor simultaneously with turning of the main reset shaft 43. As previously described, the turning off of the pump motor and consequent turning of the shaft 43 in a clockwise direction will move the yoke 83 to the left to reset the cam assembly 55 and will swing the arm 42 in a clockwise direction to return the control plate 34 to original latch position with the auxiliary valve in full open position. Subsequently, when the motor is turned on to initiate a second dispensing operation, the shaft 43 and yoke 83 and arm 42 are returned to initial position shown in FIGS. 6 and 7 of the drawings, thus completing the cycle.

It will be apparent that the device of the present invention provides a compact efficient predeterminer mechanism which may be conveniently mounted on and furnished at reasonable cost with the register and which is easy to use and foolproof in operation. Modifications and variations of the specific embodiment described as will be apparent to one skilled in the art are intended to be included within the scope of the invention.

We claim:

1. In a register having a frame and a set of number wheels rotatably mounted on a wheel supporting shaft extending transversely of the frame, the combination therewith of a cam supporting shaft mounted on the frame and extending parallel to and rearwardly of the wheel supporting shaft, a plurality of cams mounted on the cam supporting shaft, means forming a driving connection between the number wheel of lowest order and the cam supporting shaft, an actuator plate extending parallel to the cam supporting shaft and spaced from the path of the movement of the came, a third shaft extending parallel to the cam supporting shaft, and a plurality of levers pivotally mounted on the third shaft in alignment with the cams and selectively movable to a pivoted position extending into the path of movement of one of the cams for engagement between the cam and the actuator plate and a movable control member having releasing means connected to the actuator plate.

2. The combination set forth in claim 1 and including manually operable means for pivoting the levers into cam engaging position comprising a plurality of push buttons each connected to one of the levers.

3. In a register having a frame and a set of number wheels of different order mounted on a wheel supporting shaft extending transversely of the frame, the combination therewith of a cam supporting shaft mounted on the frame and extending parallel to the wheel supporting shaft, a plurality of cams mounted on the cam supporting shaft, means forming a driving connection between the number wheel of lowest order and the cam supporting shaft, a control shaft extending outwardly of the frame, a control member fixed to the control shaft for rotation therewith, a pawl engageable with the control member to retain the control member in a predetermined rotated position, an actuator plate connected to the pawl and extending parallel to the cam supporting shaft, and means for actuating the actuator plate responsive to movement of a selected one of the cams.

4. In a register having a frame and a set of number wheels of different order mounted on a wheel supporting shaft extending transversely of the frame, the combination therewith of a cam supporting shaft mounted on the frame and extending parallel to the wheel supporting shaft, a plurality of cams mounted on the cam supporting shaft, means forming a driving connection between the number wheel of lowest order and the cam supporting shaft, a control shaft extending outwardly of the frame, a control member fixed to the control shaft for rotation therewith, a pawl engageable with the control member to retain the control member in a first rotated position, means for releasing the pawl responsive to movement of a selected one of the cams, a stop for retaining the control member in a second rotated position, and means driven by the number wheel of lowest order for releasing the stop.

5. In a register having a frame and a set of number wheels of different order mounted on a wheel supporting shaft extending transversely of the frame, the combination therewith of a cam supporting shaft mounted on the frame and having a plurality of cams mounted thereon, means forming a driving connection between the register and the cam supporting shaft, a rotatable control member mounted on the register, a pawl engageable with the control member to retain the control member in a first rotated position, means for releasing the pawl responsive to movement of a selected one of the cams, a movable stop for retaining the control member in a second rotated position, and means driven by the number wheel of lowest order for periodically releasing the stop responsive to movement of said number wheel.

6. The combination set forth in claim 5 wherein the means for periodically releasing the stop comprises a rotatable notched disc connected for rotation with the number wheel of lowest order and a follower connected to the stop.

7. In a pre-settable control mechanism for liquid dispensing apparatus having flow control means and a register, the combination comprising a movable control member connected to the flow control means, a pawl retaining the control member in a first predetermined position, means for releasing the pawl at a preselected setting of the register including a cam driven by the register, a movable stop for holding the control member in a second predetermined position, and a second cam driven by the register retaining the stop in holding position, said second cam having a portion of its periphery arranged to release the stop from holding position at periodic intervals during operation thereof by the register.

8. In a pre-settable control mechanism for liquid dispensing apparatus having flow control means and a register, the combination comprising a rotatable control member connected to the flow control means for movement therewith, a stop mounted for movement toward and away from a position restraining turning movement of the control member, means on the control member for moving the stop away from restraining position, a cam follower connected to the stop, and a cam driven by the register and engaging the cam follower, said cam having a portion preventing movement of the stop away from restraining position and a portion permitting movement of the stop away from restraining position.

9. In a pre-settable control mechanism for liquid dispensing apparatus having flow control means and a register, the combination comprising a rotatable control member connected to the flow control means for movement therewith, a stop lever mounted for swinging movement toward and away from the control member, means on the control member for engaging and camming the lever away from the control member, a notched disc driven by the register, and a follower engaging the periphery of the notched disc and connected to the stop lever.

10. In a pre-settable control mechanism for liquid dispensing apparatus having flow control means and a register, the combination therewith of a rotatable control member connected to the flow control means and having a shoulder thereon, a pawl engageable with the shoulder to retain the control member in a first rotated position, a first cam driven by the register, means responsive to movement of the first cam for releasing the pawl from engagement with said shoulder, a stop movable toward and away from the control member, a lever mounted on the control member for limited pivoted movement and engageable with the stop, a second cam driven by the register, and a follower connected to the stop and engaging the second cam for periodically permitting the stop to move away from the control member responsive to movement of the second cam.

11. A pre-settable control mechanism for liquid dispensing apparatus having flow control means, comprising a register having counting means and resetting means, a rotatable control member connected to the flow control means for movement therewith, means retaining the control member in a predetermined rotated position, means driven by the counting means for releasing the last-named means at a preselected count of the register, means operated by the resetting means of the register for restoring the control member to said predetermined rotated position, and manually operable means connected to the control member for moving the control member to said predetermined rotated position independently of operation of the register resetting means.

12. A pre-settable control apparatus for liquid dispensing apparatus of the type having flow control means, comprising a register having resetting means, a cam assembly driven by the register, a movable control member connected to the flow control means for movement therewith, means retaining the control member in a predetermined position, means for releasing the last-named means including a plurality of followers, push button operated means for conditioning a selected follower for actuation by the cam assembly, means operated by the resetting means of the register for releasing the push button operated means and for restoring the control member to said predetermined position, and manually operable means for releasing the push button operated means and for restoring the control member to said predetermined position independently of operation of the register resetting means.

13. In a pre-settable control apparatus for liquid dispensing apparatus of the type having flow control means and a register having driving means, the combination therewith of a cam assembly having a plurality of cams therein, disengageable driving means between the register and the cam assembly, a control member connected to the flow control means for movement therewith, means for releasing the control member including follower means engageable with at least one of the cams in the cam assembly, a spring connected to the cam assembly which is loaded responsive to movement of the cam assembly and which returns the cam assembly to starting position upon disengagement of said driving means, and a stop engageable by the cam assembly upon return to starting position.

14. In a pre-settable control apparatus for liquid dispensing apparatus of the type having flow control means and a register, the combination therewith of a cam assembly, disengageable driving means between the register and the cam assembly, a spring connected to the cam assembly which is loaded responsive to movement of the cam assembly and which returns the cam assembly to original position upon disengagement of said driving means, an adjustable stop engageable by the cam assembly upon return to original position, a control member connected to the flow control means, first means for releasing the control member comprising a plurality of followers engageable selectively with said cam assembly and adjustable means engageable by said followers, second means for releasing the control member comprising a second cam driven by the register and a follower associated therewith, and means for adjusting the relative positions of said second cam and follower.

15. In a pre-settable control mechanism for liquid dispensing apparatus having flow control means and a register, the combination therewith of a cam assembly comprising a plurality of angularly related camming surfaces driven by the register, a movable control member connected to the flow control means, a pawl engageable with the control member to retain the control member in a first position, means for releasing the pawl including a plurality of followers movable selectively into position for engagement by one of said camming surfaces, a movable stop engageable with the control member to retain the control member in a second position, means on the control member for moving the stop to disengaging position, and a release cam driven by the register having a camming portion preventing movement of the stop to disengaging position and a portion permitting such movement.

References Cited in the file of this patent

UNITED STATES PATENTS

| | | |
|---|---|---|
| 1,919,828 | Crosby | July 25, 1933 |
| 1,977,781 | Staegemann | Oct. 23, 1934 |
| 2,358,712 | Hinds | Sept. 19, 1944 |